United States Patent [19]
Giles

[11] Patent Number: 6,123,478
[45] Date of Patent: Sep. 26, 2000

[54] FLUID APPLICATOR

[76] Inventor: Mary Jo Giles, 8435 Ridge Rd., Gasport, N.Y. 14067

[21] Appl. No.: 09/271,860

[22] Filed: Mar. 18, 1999

[51] Int. Cl.[7] .................................................... A46B 11/00
[52] U.S. Cl. ............................................................ 401/219
[58] Field of Search ................................... 401/219, 270, 401/275, 278, 279, 283, 284, 285, 290, 291, 140, 136, 197, 204, 205, 138; 47/1.5; D4/122

[56] References Cited

U.S. PATENT DOCUMENTS

| | | | |
|---|---|---|---|
| 3,076,995 | 2/1963 | Rabelow | 401/219 |
| 3,152,353 | 10/1964 | Cravener | 401/219 |
| 3,255,929 | 6/1966 | Haan | 401/219 |
| 3,427,115 | 2/1969 | Jolly | 401/219 |
| 3,453,058 | 7/1969 | Bixel | 401/219 |
| 3,850,532 | 11/1974 | Kaiser | 401/219 |
| 3,990,800 | 11/1976 | Graff | 401/219 |

FOREIGN PATENT DOCUMENTS 6921134 of 1965 Italy .

*Primary Examiner*—Henry J. Recla
*Assistant Examiner*—Huyen Le

[57] ABSTRACT

A fluid applicator for applying fluid treatments, such as herbicides, pesticides, and fertilizers, to a lawn. The fluid applicator includes an elongate shaft with a handle coupled to an upper end of the shaft and a head bar coupled to a lower end of the shaft. An elongate axle is spaced apart and extended generally parallel to the head bar with a side extent connecting the axle to the head bar. A resiliently deformable roller is rotatably mounted on the axle to permit free rotation of the roller about the axle. A fluid reservoir is coupled to the shaft. The head bar has a spaced apart plurality of fluid ports therein which are in fluid communication with the fluid reservoir.

8 Claims, 2 Drawing Sheets

FLUID APPLICATOR

BACKGROUND OF THE INVENTION

1. Field of the Invention

The present invention relates to fluid applicators for applying fluid treatments to lawns and more particularly pertains to a new fluid applicator for applying fluid treatments, such as herbicides, pesticides, and fertilizers, to a lawn.

2. Description of the Prior Art

The use of fluid applicators for applying fluid treatments to lawns is known in the prior art. More specifically, fluid applicators for applying fluid treatments to lawns heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,015,907; 4,347,684; 3,651,600; 3,230,570; 4,346,531; and U.S. Pat. No. Des. 332,009.

While these devices fulfill their respective, particular objectives and requirements, the aforementioned patents do not disclose a new fluid applicator. The inventive device includes an elongate shaft with a handle coupled to an upper end of the shaft and a head bar coupled to a lower end of the shaft. An elongate axle is spaced apart and extended generally parallel to the head bar with a side extent connecting the axle to the head bar. A resiliently deformable roller is rotatably mounted on the axle to permit free rotation of the roller about the axle. A fluid reservoir is coupled to the shaft. The head bar has a spaced apart plurality of fluid ports therein which are in fluid communication with the fluid reservoir.

In these respects, the fluid applicator according to the present invention substantially departs from the conventional concepts and designs of the prior art, and in so doing provides an apparatus primarily developed for the purpose of applying fluid treatments, such as herbicides, pesticides, and fertilizers, to a lawn.

SUMMARY OF THE INVENTION

In view of the foregoing disadvantages inherent in the known types of fluid applicators for applying fluid treatments to lawns now present in the prior art, the present invention provides a new fluid applicator construction wherein the same can be utilized for applying fluid treatments, such as herbicides, pesticides, and fertilizers, to a lawn.

The general purpose of the present invention, which will be described subsequently in greater detail, is to provide a new fluid applicator apparatus and method which has many of the advantages of the fluid applicators for applying fluid treatments to lawns mentioned heretofore and many novel features that result in a new fluid applicator which is not anticipated, rendered obvious, suggested, or even implied by any of the prior art fluid applicators for applying fluid treatments to lawns, either alone or in any combination thereof.

To attain this, the present invention generally comprises an elongate shaft with a handle coupled to an upper end of the shaft and a head bar coupled to a lower end of the shaft. An elongate axle is spaced apart and extended generally parallel to the head bar with a side extent connecting the axle to the head bar. A resiliently deformable roller is rotatably mounted on the axle to permit free rotation of the roller about the axle. A fluid reservoir is coupled to the shaft. The head bar has a spaced apart plurality of fluid ports therein which are in fluid communication with the fluid reservoir.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new fluid applicator apparatus and method which has many of the advantages of the fluid applicators for applying fluid treatments to lawns mentioned heretofore and many novel features that result in a new fluid applicator which is not anticipated, rendered obvious, suggested, or even implied by any of the prior art fluid applicators for applying fluid treatments to lawns, either alone or in any combination thereof.

It is another object of the present invention to provide a new fluid applicator which may be easily and efficiently manufactured and marketed.

It is a further object of the present invention to provide a new fluid applicator which is of a durable and reliable construction.

An even further object of the present invention is to provide a new fluid applicator which is susceptible of a low cost of manufacture with regard to both materials and labor, and which accordingly is then susceptible of low prices of sale to the consuming public, thereby making such fluid applicator economically available to the buying public.

Still yet another object of the present invention is to provide a new fluid applicator which provides in the apparatuses and methods of the prior art some of the advantages thereof, while simultaneously overcoming some of the disadvantages normally associated therewith.

Still another object of the present invention is to provide a new fluid applicator for applying fluid treatments, such as herbicides, pesticides, and fertilizers, to a lawn.

Yet another object of the present invention is to provide a new fluid applicator which includes an elongate shaft with a handle coupled to an upper end of the shaft and a head bar coupled to a lower end of the shaft. An elongate axle is spaced apart and extended generally parallel to the head bar with a side extent connecting the axle to the head bar. A resiliently deformable roller is rotatably mounted on the axle to permit free rotation of the roller about the axle. A fluid reservoir is coupled to the shaft. The head bar has a spaced apart plurality of fluid ports therein which are in fluid communication with the fluid reservoir.

Still yet another object of the present invention is to provide a new fluid applicator that eliminates the need to spray fluid treatments on to a lawn so that the user is no longer constrained to applying such treatments in low wind conditions.

Even still another object of the present invention is to provide a new fluid applicator that allows a user to accurately distribute fluid treatments on to a lawn.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
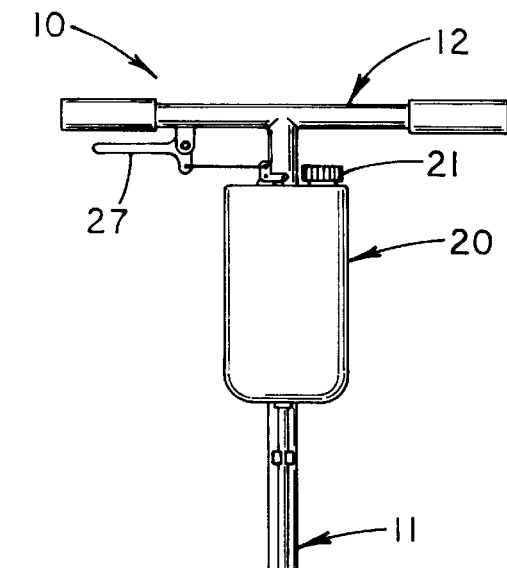
FIG. 1 is a schematic front view of a new fluid applicator according to the present invention.
Figure 2:
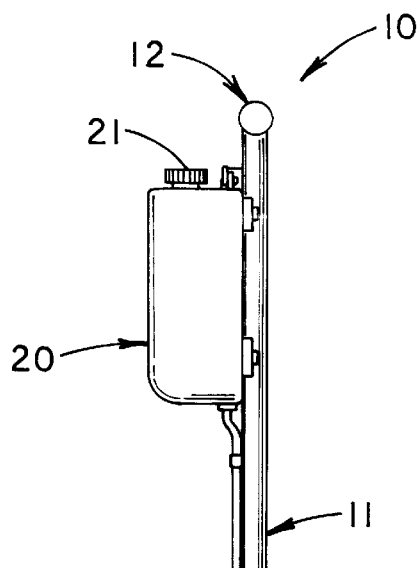
FIG. 2 is a schematic side view of the present invention.

With reference now to the drawings, and in particular to FIGS. 1 through 6 thereof, a new fluid applicator embodying the principles and concepts of the present invention and generally designated by the reference numeral 10 will be described.

As best illustrated in FIGS. 1 through 6, the fluid applicator generally comprises an elongate shaft with a handle coupled to an upper end of the shaft and a head bar coupled to a lower end of the shaft. An elongate axle is spaced apart and extended generally parallel to the head bar with a side extent connecting the axle to the head bar. A resiliently deformable roller is rotatably mounted on the axle to permit free rotation of the roller about the axle. A fluid reservoir is coupled to the shaft. The head bar has a spaced apart plurality of fluid ports therein which are in fluid communication with the fluid reservoir.

In use, the fluid applicator is designed for applying fluid treatments, such as herbicides, pesticides, and fertilizers, to a lawn.

In closer detail, the fluid applicator 10 comprises an elongate shaft 11 having opposite upper and lower ends and a longitudinal axis extending between the upper and lower ends of the shaft. A handle 12 is coupled to the upper end of the shaft. The handle is preferably extended generally perpendicular to the shaft such that the handle and shaft are arranged to form a generally T-shaped configuration.

An elongate head bar 13 is coupled to the lower end of the shaft and preferably extended generally perpendicular to the shaft. An elongate axle 14 is spaced apart and extended generally parallel to the head bar. A side extent 15 connects one end of the axle to one end of the head bar such that the axle has a free end distal the side extent.

Figure 3:
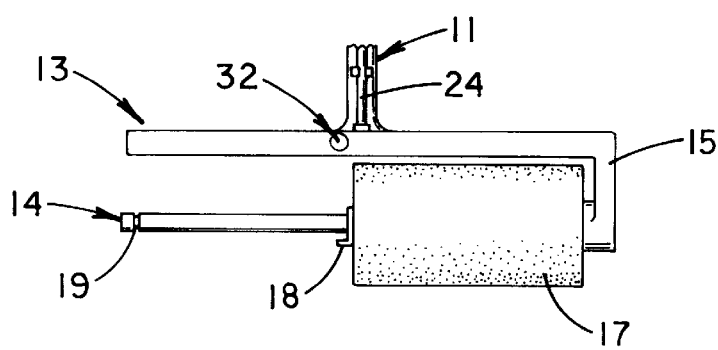
FIG. 3 is a schematic partial front view of the present invention with a second half-sized roller mounted on the axle.

A resiliently deformable roller 16,17 is rotatably mounted on the axle to permit free rotation of the roller about the axle. The roller comprises a resiliently deformable sponge material has a plurality of cells or pores designed for holding or absorbing fluid therein. Preferably, first and second rollers are provided each having a central bore to permit rotatably mounting of each roller on to the axle. The first roller 16 has a length greater than half the length of the axle defined between the ends of the axle. As illustrated in FIG. 3, the second roller 17 has a length of about one-half the length of the first roller.

Preferably, an annular retaining clip 18 is disposed on the axle such that the roller is interposed on the axle between the retaining clip and the side extent. In this preferred embodiment, the axle has a spaced apart pair of annular grooves 19 therein. The retaining clip is designed for fitting into either of the grooves to help hold the retaining clip in a fixed position on the axle. A first of the grooves is designed for to hold the first roller in position on the axle while a second of the grooves is designed for to hold the second roller in position on the axle.

A fluid reservoir 20 is coupled to the shaft and preferably positioned adjacent the upper end of the shaft for easy access. The fluid reservoir is designed for holding a fluid treatment therein such as a liquid herbicide, pesticide or fertilizer therein. The fluid reservoir preferably has a top fill opening closed with a cap 21 to permit re-filling of the fluid reservoir with fluid treatments.

Figure 4:
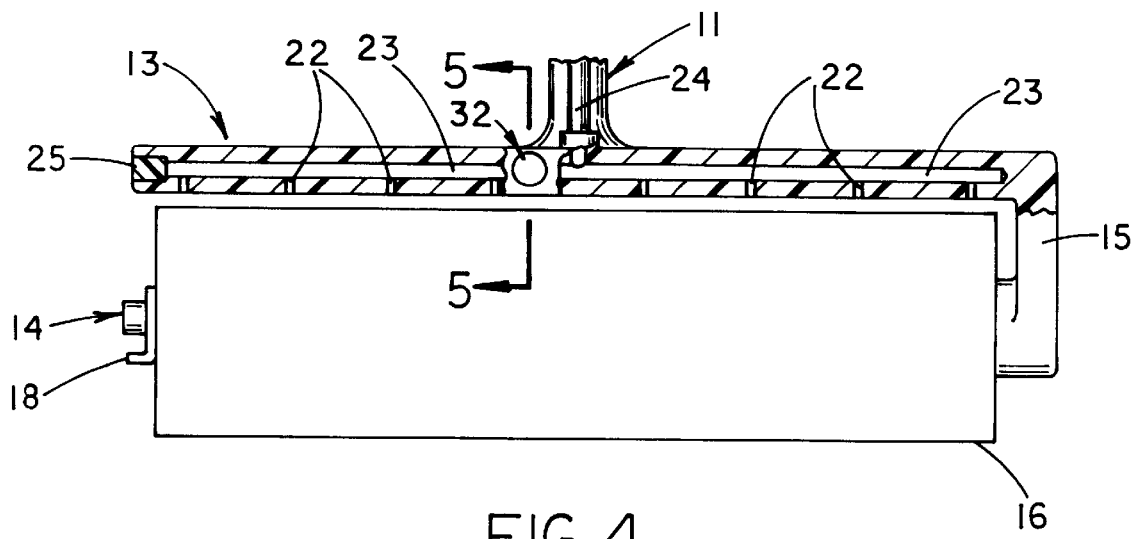
FIG. 4 is a schematic enlarged partial cross sectional view of the head bar region of the present invention.

With reference to FIG. 4, the head bar has a spaced apart plurality of fluid ports 22 therein. Each of the fluid ports is positioned towards or above the roller to permit fluid from the fluid ports to drip on to the roller. The fluid ports are in fluid communication with the fluid reservoir to permit passage of fluid treatment from the fluid reservoir and out through the fluid ports on to the roller. Preferably, the head bar has an elongate passage 23 therein fluidly connecting the fluid ports to one another. An elongate flexible tube 24 extends along the shaft between the fluid reservoir and the passage of the head bar fluidly connects the fluid reservoir to the fluid ports.

Figure 5:
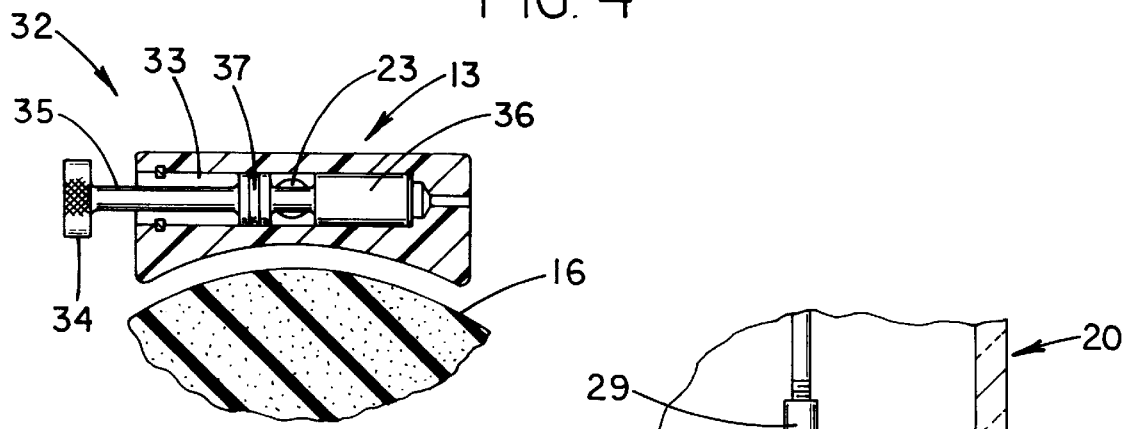
FIG. 5 is a schematic cross sectional view taken from line 5—5 of FIG. 4 illustrating the lower valve.

With reference to FIG. 4, in a preferred embodiment, the head bar has an end opening into the passage of the head bar to permit drainage of excess fluid in the passage after use of the applicator. As illustrated in FIG. 5, a removable stopper 25 is inserted into the end opening to substantially close the end opening.

Figure 6:
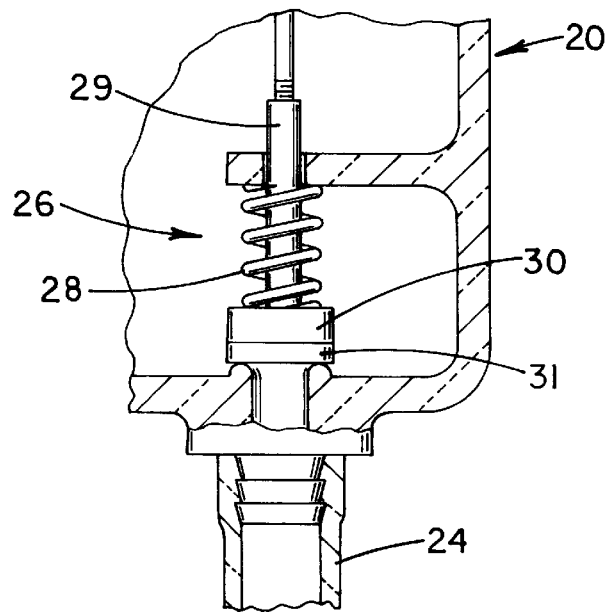
FIG. 6 is a schematic breakaway view of the upper valve in the fluid reservoir.

An upper valve 26 positioned between the fluid reservoir and the fluid port for selectively opening and closing passage of fluid therebetween. With reference to FIG. 6, the upper valve is preferably located in the fluid reservoir and has an actuating lever 27 (see FIG. 1) pivotally mounted to the handle to permit selective opening and closing of the upper valve upon pivoting of the actuating lever. The upper valve ideally comprises a spring 28 biased rod 29 having a bottom stopper 30 positioned over an open upper end of the flexible tube connected to the fluid reservoir to close the open upper end of the flexible tube until the actuating lever is pivoted to pull the rod away from the open upper end of the flexible tube. Preferably, the stopper has a resiliently deformable rubber or plastic pad 31 for providing a watertight closure of the open upper end of the flexible tube when the stopper is covering the open upper end.

The head bar preferably has a lower valve 32 in the passage of the head bar for selectively opening and closing passage of fluid from the fluid reservoir to a first group of the plurality of fluid ports positioned towards a free end of the head bar distal the side extent. Preferably, as best illustrated in FIGS. 1 and 4, the lower valve is positioned adjacent the lower end of the shaft. As best illustrated in FIG. 5, ideally, the lower valve comprises a sliding valve in a bore 33 extending into the passage. The sliding valve has a pull head 34, a shaft 35, and a closure head 36 that is positionable in the bore into a first position where it blocks passage of fluid treatment through the passage and a second position where passage of fluid through the passage is unblocked by the closure head. Ideally, the closure head has an annular rubber gasket 37 therearound forming a seal between the closure head and the bore to prevent fluid from seeping out of the bore. In use, the lower valve is opened when the first roller is mounted on the axle to permit flow of fluid treatment to the entire length of the first roller and the lower valve is closed when the second roller is mounted on the axle so that fluid only drips on second roller.

In use, a user fills the reservoir with a fluid lawn treatment. The upper and lower valves are opened (when using the larger first roller) to let the fluid lawn treatment flow out of the fluid ports on to the roller. The user may then roll the roller over a portion of the lawn to treat the lawn with the fluid lawn treatment.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fluid applicator, comprising:
an elongate shaft having opposite upper and lower ends;
a handle being coupled to said upper end of said shaft;
an elongate head bar being coupled to said lower end of said shaft;
an elongate axle being spaced apart and extended generally parallel to said head bar, a side extent connecting said axle to said head bar such that said axle has a free end distal said side extent;
a resiliently deformable roller being rotatably mounted on said axle to permit free rotation of said roller about said axle;
a fluid reservoir being coupled to said shaft;
said head bar having a spaced apart plurality of fluid ports therein;
said fluid ports being in fluid communication with said fluid reservoir; and
wherein said head bar has a lower valve for selectively closing passage of fluid from said fluid reservoir to a first group of said plurality of fluid ports positioned towards a free end of said head bar distal said side extent.

2. The fluid applicator of claim 1, wherein said handle is extended generally perpendicular to said shaft such that said handle and shaft are arranged to form a generally T-shaped configuration.

3. The fluid applicator of claim 1, wherein said head bar is extended generally perpendicular to said shaft.

4. The fluid applicator of claim 1, wherein said roller comprises a resiliently deformable sponge material.

5. The fluid applicator of claim 1, further comprising an annular retaining clip being disposed on said axle such that said roller is interposed on said axle between said retaining clip and said side extent.

6. The fluid applicator of claim 1, wherein said fluid reservoir is positioned adjacent said upper end of said shaft.

7. The fluid applicator of claim 1, further comprising an upper valve positioned between said fluid reservoir and said fluid ports.

8. A fluid applicator, comprising:
an elongate shaft having opposite upper and lower ends and a longitudinal axis extending between said upper and lower ends of said shaft;
a handle being coupled to said upper end of said shaft, said handle being extended generally perpendicular to said shaft such that said handle and shaft are arranged to form a generally T-shaped configuration;
an elongate head bar being coupled to said lower end of said shaft, said head bar being extended generally perpendicular to said shaft;
an elongate axle being spaced apart and extended generally parallel to said head bar, a side extent connecting said axle to said head bar such that said axle has a free end distal said side extent;
a resiliently deformable roller being rotatably mounted on said axle to permit free rotation of said roller about said axle, said roller comprising a resiliently deformable sponge material;
an annular retaining clip being disposed on said axle such that said roller is interposed on said axle between said retaining clip and said side extent;
a fluid reservoir being coupled to said shaft and positioned adjacent said upper end of said shaft;
said head bar having a spaced apart plurality of fluid ports therein, each of said fluid ports being positioned towards said roller;
said fluid ports being in fluid communication with said fluid reservoir;
wherein said head bar has an elongate passage therein fluidly connecting said fluid ports to one another, wherein an elongate flexible tube extended along said shaft between said fluid reservoir and said passage of said head bar fluidly connects said fluid reservoir to said fluid ports;

said head bar having an end opening into said passage of said head bar, a removable stopper being inserted into said end opening to substantially close said end opening;

an upper valve positioned between said fluid reservoir and said fluid port for selectively closing passage of fluid therebetween, said upper valve being located in said fluid reservoir and having an actuating lever pivotally mounted to said handle to permit selective opening and closing of said upper valve upon pivoting of said actuating lever; and said head bar having a lower valve for selectively closing passage of fluid from said fluid reservoir to a first group of said plurality of fluid ports positioned towards a free end of said head bar distal said side extent.

* * * * *